United States Patent
Loeb

(10) Patent No.: US 7,437,316 B1
(45) Date of Patent: Oct. 14, 2008

(54) METHODS AND SYSTEMS FOR AUTOMATED RADIO ORDERING AND FULFILLMENT

(75) Inventor: Michael R. Loeb, Darien, CT (US)

(73) Assignee: Synapse Group, Inc., Stanford, CT (US)

( * ) Notice: Subject to any disclaimer, the term of this patent is extended or adjusted under 35 U.S.C. 154(b) by 396 days.

(21) Appl. No.: 10/877,353

(22) Filed: Jun. 25, 2004

(51) Int. Cl.
*G06Q 30/00* (2006.01)

(52) U.S. Cl. .............................. 705/26; 705/1; 705/14; 705/27; 707/10; 455/3.04; 455/3.06; 455/414.1

(58) Field of Classification Search .................. 705/26, 705/27, 1, 14; 455/414.1, 3.04, 3.06; 379/114.21, 379/200; 368/10; 707/10
See application file for complete search history.

(56) References Cited

U.S. PATENT DOCUMENTS

| | | | |
|---|---|---|---|
| 5,054,059 A * | 10/1991 | Stern et al. | 379/200 |
| 6,584,309 B1 * | 6/2003 | Whigham | 455/414.1 |
| 6,678,215 B1 * | 1/2004 | Treyz et al. | 368/10 |
| 7,127,236 B2 * | 10/2006 | Khan et al. | 455/414.1 |
| 2002/0143645 A1 | 10/2002 | Odinak et al. | 705/26 |
| 2003/0060157 A1 | 3/2003 | Henrick | 455/3.04 |
| 2003/0086546 A1 * | 5/2003 | Falcone et al. | 379/114.21 |
| 2003/0097362 A1 * | 5/2003 | Newsteder | 707/10 |
| 2003/0130864 A1 * | 7/2003 | Ho et al. | 705/1 |
| 2003/0171096 A1 * | 9/2003 | Ilan et al. | 455/3.06 |
| 2003/0212996 A1 | 11/2003 | Wolzien | 725/60 |
| 2003/0224754 A1 | 12/2003 | Herzog | 455/406 |

* cited by examiner

*Primary Examiner*—Yogesh C Garg
(74) *Attorney, Agent, or Firm*—Edwards Angell Palmer & Dodge LLP; David J. Silvia

(57) ABSTRACT

There are provided methods and systems enabling a customer to order products from an audio advertisement, for example from a radio advertisement heard in an automobile, using only a standard audio receiver and mobile telephone. Pre-registration by the retailer advertising the product enables the storing of pertinent product information by a fulfillment center. Pre-approval of mobile telephone service(s) enables billing to be performed through a customer's mobile telephone account. The actual customer order is completed by simply dialing the telephone number transmitted in the advertisement. The remainder of the fulfillment and billing process is substantially automated. More specifically, the fulfillment center uses the dialed telephone number to determine the ordered product and the calling telephone number to determine delivery information. If the calling number is through an approved mobile telephone service provider and caller information can be determined, fulfillment occurs automatically with billing through the mobile phone account. If the calling number is not through an approved service or caller information is not determinable, the call is directed for other processing.

20 Claims, 3 Drawing Sheets

METHODS AND SYSTEMS FOR AUTOMATED RADIO ORDERING AND FULFILLMENT

FIELD OF THE INVENTION

The present invention relates generally to methods and systems for fulfilling product and service offerings and more particularly to methods and systems for fulfilling product and service offerings initiated through audio transmissions.

BACKGROUND OF THE INVENTION

Radio is a big media channel that generates billions of dollars a year in advertising revenue. However, radio advertising has limitations that diminish its value to direct response marketers, a significant category of advertisers who invest substantial resources in other forms of media.

Many of radio's listeners do so during their driving time, for example during the well-known morning and evening commute times. One significant limitation of radio advertising is that there is no good mechanism through which drivers may purchase goods and services in direct response to advertisements while driving. Some direct response advertisers on radio have attempted to capture the attention and recollection of drivers by using memorable mnemonic phone numbers, repeated several times during each commercial. It is hoped that drivers will remember and use these 'catchy' telephone numbers following the completion of their commute. However, the ability of drivers to remember and subsequently respond using a memorized telephone number is problematic at best, greatly reducing the effectiveness of such advertising.

U.S. Patent Application Publication US 2003/0212996 A1, titled: System for Interconnection of Audio Program Data Transmitted by Radio to Remote Vehicle or Individual with GPS Location, shows a system whereby a radio advertiser can transmit an advertisement to a driver who, upon signaling an interest in purchasing the product or service, receives GPS-based directions to the nearest retail establishment having the product or service. Upon arriving at the store, a mobile transaction enabling system, based upon a transmitter contained in the automobile and a receiver operated by the store, i.e. an EZ-PASS type device, can transmit customer and billing information to the store. The system suffers from the drawback that the customer must respond to the advertisement and redirect their travel to purchase the advertised goods.

U.S. Patent Application Publication US 2003/0060157 A1, titled: Purchase and Delivery of Digital Content Using Multiple Devices and Data Networks, shows a system whereby a customer receiving audio and/or video content may use a cellular telephone to order that content and have that content delivered through a network to a selected one of multiple devices. They system is relatively limited in the types of products and services which may be ordered.

It would thus be desirable to provide a simple and effective means by which a customer could order products or services responsive to an audio advertisement. Preferably such means would require only normal devices typically within the possession of a listener, particularly an automobile driver. Preferably such means would require no pre-registration or set-up by the customer and would be sufficiently simple to operate such that it would not interfere with the operation of a motor vehicle.

SUMMARY OF THE INVENTION

An object of the invention is to simplify customer response to direct-marketed audio advertisements. Improved customer response to radio advertisements would have the advantage of significantly increasing advertising revenue from direct-marketers to radio stations.

In accordance with one embodiment of the present invention there are provided method and systems for fulfilling product orders, a method comprising: receiving a telephone call from a customer; determining if the telephone call is received through an approved mobile telephone service provider; determining the dialed number of the telephone call; determining a product associated with the dialed number; determining the calling number of the telephone call; determining if customer information can be obtained based upon the calling number; and initiating, if the telephone call is from an approved mobile telephone service provider and if customer information can be obtained based upon the calling number, delivery of the product to the customer.

In accordance with another embodiment of the invention there are provided methods and systems for advertising of products, a method comprising: storing a plurality of callable telephone numbers; storing a product identifier in association with each of the plurality of callable telephone numbers; communicating the plurality of callable telephone numbers with associated product identifiers to a fulfillment center; creating an advertisement for a selected product associated with one of the plurality of callable telephone numbers; including in the advertisement the callable telephone number associated with the identified product; and initiating an audio broadcast of the advertisement with the callable telephone number associated with the identified product.

In accordance with yet another embodiment of the invention there are provided methods and systems for ordering a product, a method comprising: receiving an audio advertisement for a product including a telephone number; dialing the telephone number on a cellular telephone operated by an approved cellular telephone service; terminating the call to the dialed telephone number substantially immediately after the call is connected; receiving, as a result of the dialing, the product; and receiving a bill for the product through the approved cellular telephone service.

The reader will thus appreciate that, in accordance with the present invention, a customer may order products and services in response to a radio advertisement by simply dialing an advertised telephone number. With no further action on the part of the customer, the products or services associated with that advertisement will be delivered to the customer and the customer will be billed in accordance with the registered information.

DESCRIPTION OF THE DRAWING FIGURES

These and other objects, features and advantages of the invention will become apparent from a consideration of the following Detailed Description of the Invention in consideration with the drawing Figures in which.

DETAILED DESCRIPTION OF THE INVENTION

Figure 1:
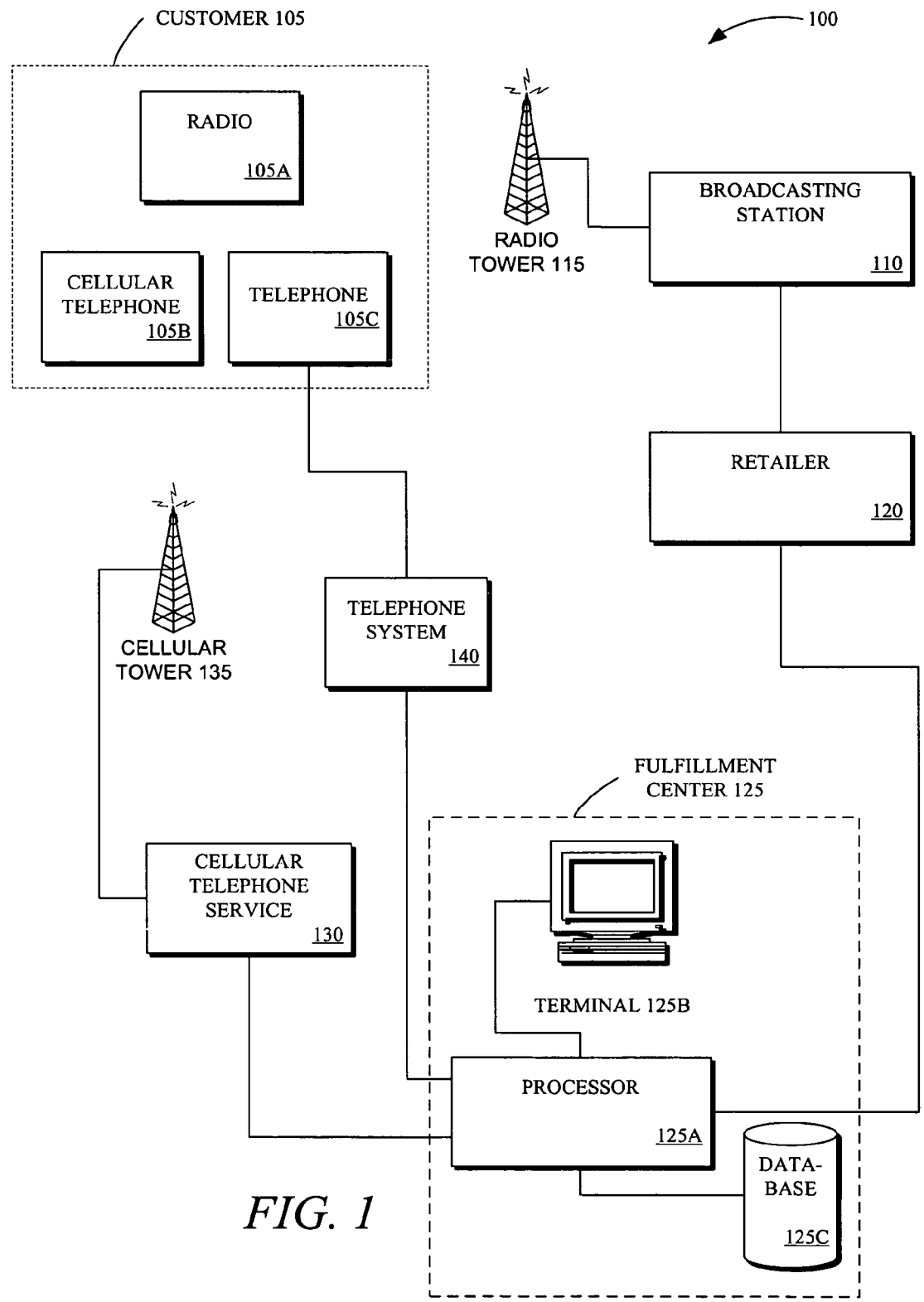
FIG. 1 is a block diagram of a system in accordance with the present invention.

With reference to FIG. 1, there is shown a system 100 including a customer 105 and a broadcasting station 110 with a radio tower 115. A retailer 120 is connected to broadcasting station 115. A fulfillment center 125 is connected to retailer 120 and to receive telephone calls from a cellular telephone service 130 and other types of telephone systems 140. It will be understood that telephone system 140 is representative of all non-cellular telephone systems, for example including: i) conventional 'plain old telephone systems,' or POTS, and ii) voice-over-Internet protocol (VOIP) telephone systems.

Customer 105, comprising, for example, a human customer in an automobile, home or other environment, includes a radio 105A and a cellular telephone 105B and/or a non-cellular telephone 105C. Radio 105A comprises, for example, an AM radio, FM radio or a satellite radio. Cellular telephone 105B comprises a conventional mobile telephone which may be mounted within an automobile or portable for use by the customer. Many different types of cellular telephones and service providers are known to the reader. While only one customer 105 is shown to illustrate the present invention, it will be understood by the reader that anyone listening to an audio transmission such as a radio, that is countless numbers of people, comprise potential customers.

It will be understood that if customer 105 is in an automobile, there will likely be present the driver and potentially one or more passengers, at least one radio 105A and in many instances a cellular telephone 105B. If customer 105 is in a different environment, for example a home, there will likely be a radio 105A and both a cellular telephone 105B and a non-cellular telephone 105C available.

Broadcasting station 110 and tower 115 together comprise a conventional radio broadcasting station capable of broadcasting audio content for receipt and playing by radio 105A. Retailer 120 comprises any retailer wishing to advertise by radio through broadcasting station 110 to customer 105, countless ones of which are known to the reader. Fulfillment center 125 comprises a conventional fulfillment center for delivering products and services sold by retailer 120 to the customer. Fulfillment center 125 may be owned by and comprise a part of the retailer or may be a separate service operating under agreement with the retailer.

For purposes of illustration, fulfillment center is seen to comprise a processor 125A connected to a terminal 125B and a database 125C. Processor 125A is connected in a conventional manner to receive telephone calls from cellular telephone 105B or non-cellular telephone 105C, for example through a switchboard and/or an interactive voice response service (IVR), many of which are known in the art. Numerous configurations of fulfillment center 125 are known to the reader, dependent on various factors including the types of products and services being processed by the fulfillment center.

As used herein, the terms "product" and "service" and variants thereof each include both products and services marketable by retailer 120 to customers.

The various parties including broadcasting station 110, retailer 120, fulfillment center 125 and cellular telephone service 130 communicate through one or more of many known, appropriate channels including, for example by, a private network, a public network such as the Internet, telephone, mail, facsimile or any other communication channel appropriate to the communications described below.

Figure 2:
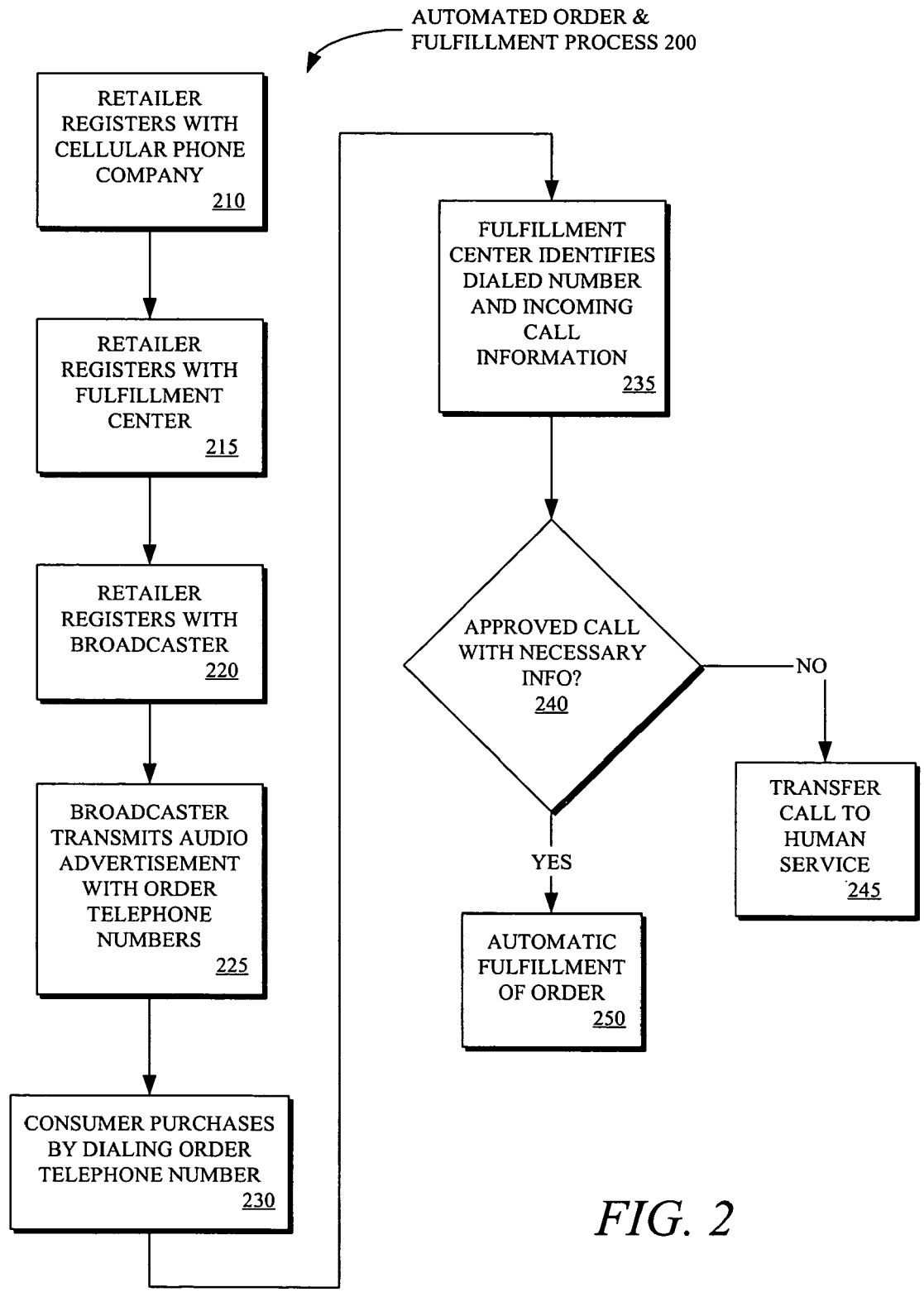
FIG. 2 is a flow chart showing an automated order and fulfillment process in accordance with the present invention.

The operation of the present invention will now be described with respect to FIGS. 2 through 4, the invention illustrated with respect to the use of radio advertisements. With reference now to FIG. 2, there is shown an automated order and fulfillment process 200 by which orders may be placed by customer 105 responsive to advertisements by retailer 120 transmitted over broadcasting station 110 and received on radio 105A.

Initially, retailer 120 registers with cellular telephone company 130 (step 205). During this registration process, retailer 120 obtains particular telephone numbers, useable in the time frames and geographies required by the retailer, by which the customers can order products. In one embodiment, the dial-in numbers provided by cellular telephone service 130 are shortened numbers or simple codes, selected to simplify dialing by the customer.

Further during this registration process, retailer 120 and cellular telephone service 130 enter into an agreement whereby the retailer is permitted to bill products and services directly to the cellular telephone accounts of customers ordering products and services. For purposes of describing the invention, cellular telephone services who agree to bill cellular telephone customer accounts for products and services ordered by a customer are referred to as 'approved' services, while those cellular telephone services that have not or will not agree to bill customer accounts in this manner are referred to as 'unapproved' services.

Continuing with reference to FIG. 2, subsequent to registering with one or more cellular telephone services as described above, retailer 120 next registers with fulfillment center 125 (step 215). With reference now to FIG. 3, the process 215 whereby retailer 120 registers with fulfillment center 125 is shown, the retailer registering sufficient information whereby the fulfillment center can provide to customers products purchased by orders placed while listening to an audio advertisement. More particularly, the retailer registers product information sufficient to enable the fulfillment center to identify, obtain and deliver the ordered products (step 305).

Figure 3:
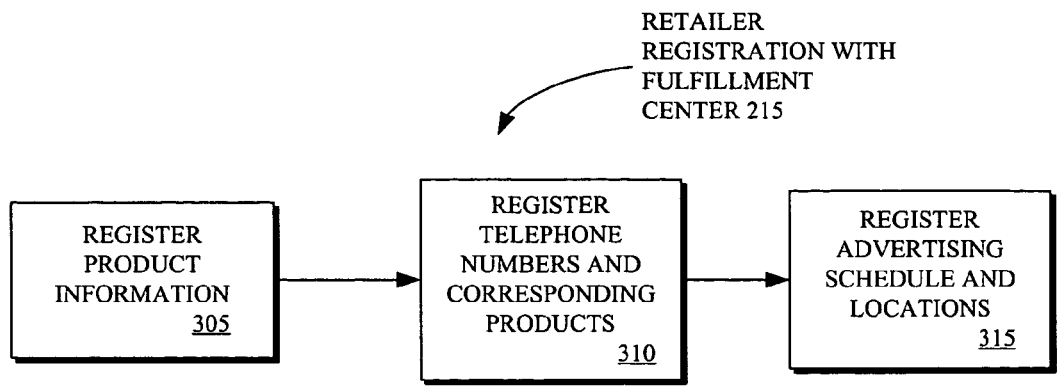
FIG. 3 is a flow chart showing a retailer registration process.

Continuing with reference to FIG. 3, fulfillment center 125 is provided a list established by retailer 120 of telephone numbers to be used in the advertising program and the corresponding product associated with each telephone number (step 310). In the described embodiment, the fulfillment center is provided the radio advertising schedule including dates and geographic locations (step 315) for the various product advertisements.

Table 1 below shows exemplary information provided by retailer 120 to fulfillment center 125. It will be seen, in accordance with a key feature of the present invention, that each telephone number is associated with a single product. Thus, the fulfillment center knows upon receiving a call on an identified telephone number, that the incoming call is an order for or otherwise relates to one identified product. While effective dates and geographical locations for the advertising program are provided to fulfillment center 125, it will be recognized that, due to the nature of audio advertising, orders are likely to come from outside of the effective dates and geographical locations. Retailer 120 and fulfillment center 125 will decide amongst themselves how to handle orders received outside of the effective dates and anticipated geographical locations.

TABLE 1

| Telephone Number | Product Information | Effective Dates | Geographical Info. |
|---|---|---|---|
| 111.222.3456 | Product A Information | Jan. 1, 2003- Mar. 1, 2003 | Northeast |
| 111.333.3456 | Product B Information | Feb. 1, 2003- Mar. 1, 2003 | Washington, DC |
| 111.444.3456 | Product C Information | Jan. 1, 2003 | Apr. 15, 2003 |

The reader will appreciate that the described interactions and information exchanged between retailer 120 and fulfillment center 125 are to enable the fulfillment center to timely and deliver products to customers for the retailer, and that the information exchanged and arrangements established between the retailer and fulfillment center may vary depending on each particular advertising campaign and the products offered therein.

With reference back to FIG. 2, retailer 120 registers with broadcasting station 110, providing the station with advertising content, schedules and other conventional advertising data used by the station to air radio advertisements (step 220). Following the various registrations, set-ups and exchanges of information provided above, broadcast station 110 transmits the radio advertisements, including with each product advertisement the telephone number particular to the advertised product or service (step 225).

As shown in FIG. 2, upon hearing the radio advertisement, the customer purchases the advertised product by dialing the telephone number provided in the radio advertisement (step 230). The telephone call is received by fulfillment center 125, which readily determines i) the incoming, dialed number and other pertinent incoming call data including i) the calling number and identity of the caller, ii) the address of the caller, and iii) whether the call is from a cellular telephone operated by an approved cellular telephone service (step 235).

The incoming, dialed number is of course immediately determined by an IVR or any appropriate answering service simply by identifying the incoming line the call is received on. The calling number and identity of the caller are determined using conventional automatic number identifier (ANI) systems in cooperation with reverse telephone number look-ups. The information provided thereby will typically be sufficient for fulfillment center 125 to bill and ship product(s) to the ordering customer. As noted above, it is also determined if the incoming call is from a mobile phone serviced by an approved cellular telephone service. This is determined by using the ANI and commercially available services to determine the cellular telephone service, in combination with a look-up in local data maintained in database 125C of fulfillment center 125 to determine if the service is approved, that is one with whom retailer 120 has a billing agreement as noted herein above.

Continuing with reference to FIG. 2, upon determining relevant incoming call information, if the call is not from an approved cellular telephone service or if there is necessary fulfillment information unavailable (step 240), the call is directed to a human service or an appropriate IVR to process (step 245). If the call is from an approved cellular telephone service and necessary customer identification and fulfillment information are available from the various sources described above, an automated fulfillment process occurs (step 250) by which the ordered product(s) are delivered to the customer.

Figure 4:
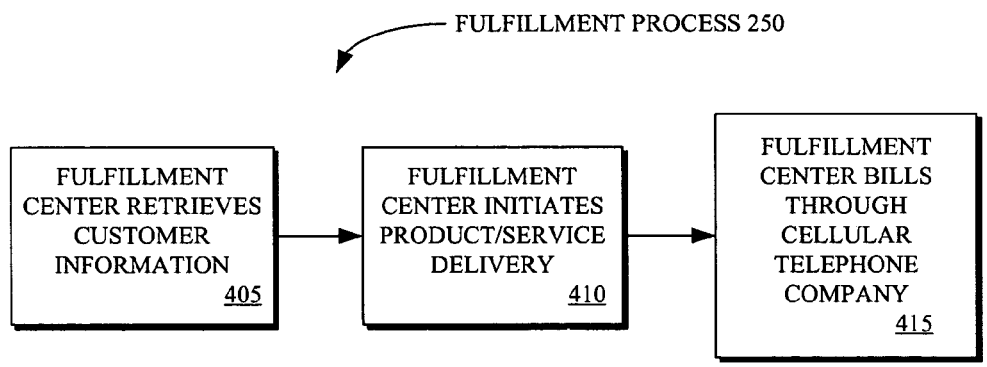
FIG. 4 is a flow chart showing the details of a fulfillment process.

The details of automated fulfillment process 250 are shown in FIG. 4, whereby fulfillment center 125 retrieves the customer identity and address information (step 405) determined above (see FIG. 2) and uses that information for product fulfillment, including the delivery of the products (step 410) and billing of the customer (step 415). As noted above, when a mobile telephone call is place through an approved cellular telephone service, a pre-established agreement enables fulfillment center 120 to initiate billing by notifying the approved service to place the appropriate charge onto the caller's cellular telephone bill. As further noted above, orders received using an unapproved cellular telephone service and/or missing necessary fulfillment information are processed by a different method, for example by a human operator or an appropriately programmed interactive voice response service.

There are thus provided methods and systems that enable a customer to order products from an audio transmission, for example from a radio advertisement heard in an automobile, using only a standard receiver and mobile telephone. The invention requires no pre-registration by the customer and operates for the customer in a substantially automated manner. The present invention is anticipated to significantly increase customer response to direct advertising during drive time, resulting in increased radio advertising revenue from direct marketers. The invention provides significant benefits to customers, enabling them to safely, simply and effectively place orders for products while in an automobile. The invention has application in the field of advertising and particularly radio advertising.

While the invention has been described with respect to particular embodiments, it is not thus limited. Numerous modifications, changes and enhancements will now occur to the reader within the scope of the invention.

What is claimed is:

1. A process operating on a computer fulfilling orders for products that have been advertised on the radio, comprising:
   receiving a telephone call from a customer seeking to order a product that has been advertised on the radio and is located remotely from the customer;
   determining if the telephone call is received through an approved mobile telephone service provider;
   determining the dialed number of the telephone call;
   determining a product associated with the dialed number;
   determining the calling number of the telephone call;
   determining if customer information can be obtained based upon the calling number;
   initiating, if the telephone call is from an approved mobile telephone service provider and if customer information can be obtained based upon the calling number, delivery of the remotely located product to the customer;
   if the telephone call is not from an approved mobile telephone service provider or if customer information can not be obtained based upon the calling number, transferring the call to a pre-established service; and
   wherein all the above steps are performed on a computer network system.

2. The method of claim 1 wherein the pre-established service includes a human operator.

3. The method of claim 1 wherein the step of determining if the telephone call is from an approved mobile telephone service provider comprises identifying at least one approved mobile telephone service provider prior to the receiving of the telephone call.

4. The method of claim 1 wherein the step of identifying at least one approved mobile telephone service provider includes establishing an agreement with the approved mobile telephone service provider to bill for a product ordered by the customer through the customer's mobile telephone account.

5. The method of claim 1 and further comprising the step of billing the customer for the product.

6. The method of claim 5 wherein the step of billing the customer includes initiating the billing on the customer's mobile telephone bill.

7. The method of claim 1 wherein the step of determining a product associated with the dialed number includes the steps of:
storing a plurality of telephone numbers each associated with a product; and
identifying the product associated with the dialed number.

8. The method of claim 1 wherein the step of determining if customer information can be obtained based upon the calling number includes using the calling number to identify the customer and the address of the customer.

9. A system to fulfill orders for products advertised on the radio, comprising:
a processor;
a memory connected to the processor and storing instructions to control the operation of the processor to perform the steps of:
receiving a telephone call from a customer in response to a radio advertisement; wherein the customer is seeking to order a product that is located remotely from the customer;
determining if the telephone call is received through an approved mobile telephone service provider;
determining the dialed number of the telephone call;
determining a product associated with the dialed number based on information provided by a retailer;
determining the calling number of the telephone call;
determining if customer information can be obtained based upon the calling number;
initiating, if the telephone call is from an approved mobile telephone service provider and if customer information can be obtained based upon the calling number, delivery of the remotely located product to the customer; and if the telephone call is not from an approved mobile telephone service provider or if customer information can not be obtained based upon the calling number, transferring the call to a pre-established service.

10. The system of claim 9 wherein the step of determining if the telephone call is from an approved mobile telephone service provider comprises identifying at least one approved mobile telephone service provider prior to the receiving of the telephone call.

11. The system of claim 10 wherein the step of identifying at least one approved mobile telephone service provider includes establishing an agreement with the approved mobile telephone service provider to bill for a product ordered by the customer through the customer's mobile telephone account.

12. The system of claim 9, the processor further operative to perform the step of billing the customer for the product.

13. The system of claim 12 wherein the step of billing the customer includes initiating the billing on the customer's mobile telephone bill.

14. The system of claim 9 wherein the step of determining a product associated with the dialed number includes the steps of:
storing a plurality of telephone numbers each associated with a product; and
identifying the product associated with the dialed number.

15. The system of claim 9 wherein the step of determining if customer information can be obtained based upon the calling number includes using the calling number to identify the customer and the address of the customer.

16. A system for fulfilling product orders, comprising:
means for receiving a telephone call from a customer;
means for determining if the telephone call is received through an approved mobile telephone service provider;
means for determining the dialed number of the telephone call; means for determining a product associated with the dialed number based upon information including at least one of the date of the customer's call and the geographic location of the customer's call;
means for determining the calling number of the telephone call;
means for determining if customer information can be obtained based upon the calling number;
means for initiating, if the telephone call is from an approved mobile telephone service provider and if customer information can be obtained based upon the calling number, delivery of the product to the customer; and
means for, if the telephone call is not from an approved mobile telephone service provider or if customer information can not be obtained based upon the calling number, transferring the call to a pre-established service.

17. The method of claim 1 wherein the step of determining the product associated with the dialed number is based in part on determining a geographical region in which the customer's telephone call originated.

18. The method of claim 1 wherein the step of determining the product associated with the dialed number is based in part on determining the date of the customer's telephone call.

19. The system of claim 9 wherein the step of determining the product associated with the dialed number is based in part on determining a geographical region in which the customer's telephone call originated.

20. The system of claim 9 wherein the step of determining the product associated with the dialed number is based in part on determining the date of the customer's telephone call.

* * * * *